US012792691B2

(12) United States Patent
Khorasgani et al.

(10) Patent No.: US 12,792,691 B2
(45) Date of Patent: Nov. 10, 2026

(54) K-NEAREST MULTI-AGENT REINFORCEMENT LEARNING FOR COLLABORATIVE TASKS WITH VARIABLE NUMBER OF AGENTS

(71) Applicant: Hitachi, Ltd., Tokyo (JP)

(72) Inventors: Hamed Khorasgani, San Jose, CA (US); Haiyan Wang, Fremont, CA (US); Hsiu-Khuern Tang, San Jose, CA (US); Chetan Gupta, San Mateo, CA (US)

(73) Assignee: HITACHI, LTD., Tokyo (JP)

( * ) Notice: Subject to any disclaimer, the term of this patent is extended or adjusted under 35 U.S.C. 154(b) by 1141 days.

(21) Appl. No.: 17/706,382

(22) Filed: Mar. 28, 2022

(65) Prior Publication Data

US 2023/0306084 A1 Sep. 28, 2023

(51) Int. Cl.

| | |
|---|---|
| ***G06F 18/21*** | (2023.01) |
| ***G05B 13/02*** | (2006.01) |
| ***G06F 18/214*** | (2023.01) |
| ***G06F 18/23213*** | (2023.01) |

(52) U.S. Cl.

CPC ..... *G06F 18/2178* (2023.01); *G05B 13/0265* (2013.01); *G06F 18/214* (2023.01); *G06F 18/23213* (2023.01)

(58) Field of Classification Search

None

See application file for complete search history.

(56) References Cited

PUBLICATIONS

Elsayed-Aly, Ingy (Aly) et al, "Safe Multi-Agent Reinforcement Learning via Shielding" Feb. 2, 2021 [Online] Downloaded Apr. 23, 2025 https://arxiv.org/pdf/2101.11196 (Year: 2021).*

Khaldi, Belkacem et al. "Flexible and Efficient Topological Approaches for a Reliable Robots Swarm Aggregation" 2019 [Online] Downloaded Apr. 23, 2025 https://ieeexplore.ieee.org/stamp/stamp.jsp?tp=&arnumber=8769830 (Year: 2019).*

Haarnoja, Tuomas et al. "Soft Actor-Critic: Off-Policy Maximum Entropy Deep Reinforcement Learning with a Stochastic Actor" 2018 [Online] Downloaded Apr. 23, 2025 (Year: 2018).*

Liu, Ruishan and James Zou. "The Effects of Memory Replay in Reinforcement Learning" 2018 [Online] Downloaded Apr. 23, 2025 https://ieeexplore.ieee.org/stamp/stamp.jsp?tp=&arnumber=8636075 (Year: 2018).*

* cited by examiner

*Primary Examiner* — Ben M Rifkin

(74) *Attorney, Agent, or Firm* — PROCOPIO, CORY, HARGREAVES & SAVITCH LLP

(57) ABSTRACT

K-nearest multi-agent reinforcement learning for collaborative tasks with variable numbers of agents. Centralized reinforcement learning is challenged by variable numbers of agents, whereas decentralized reinforcement learning is challenged by dependencies among agents' actions. An algorithm is disclosed that can address both of these challenges, among others, by grouping agents with their k-nearest agents during training and operation of a policy network. The observations of all k+1 agents in each group are used as the input to the policy network to determine the next action tor each of the k+1 agents in the group. When an agent belongs to more than one group, such that multiple actions are determined for the agent, an aggregation strategy can be used to determine the final action for that agent.

14 Claims, 8 Drawing Sheets

FIG. 3
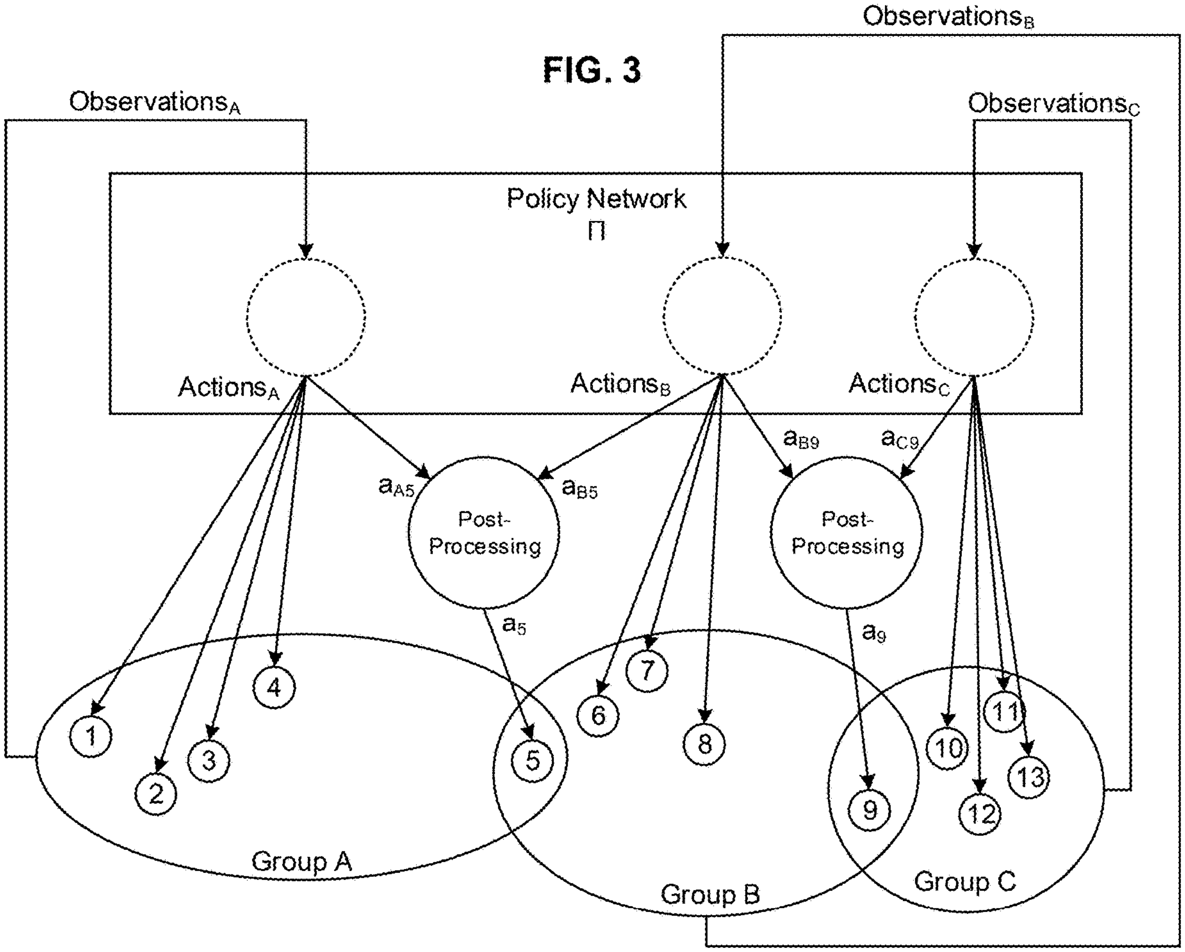
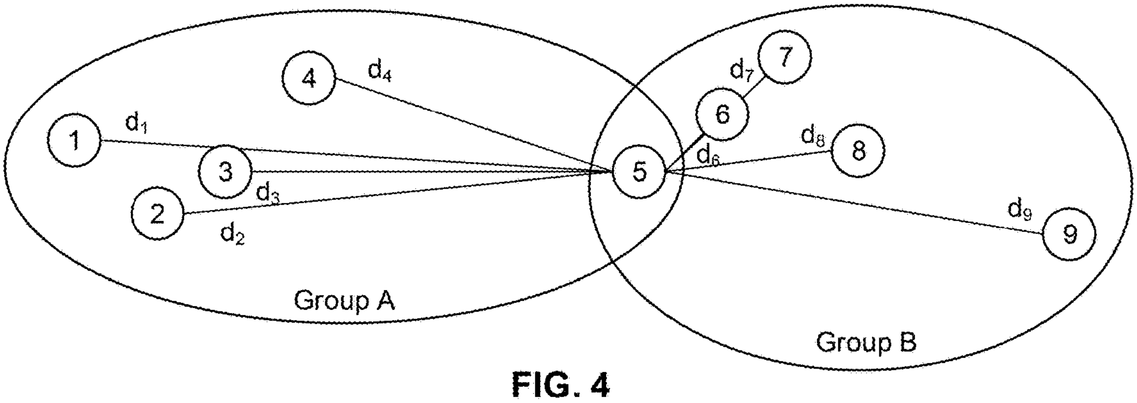
FIG. 4

FIG. 9
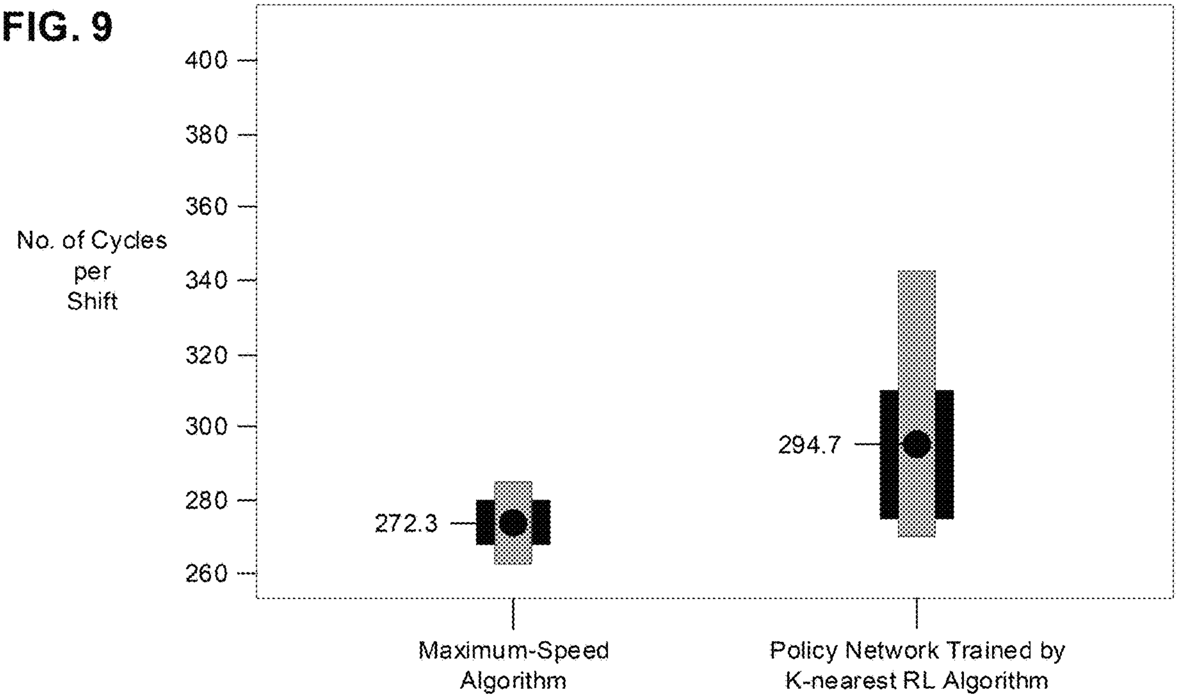
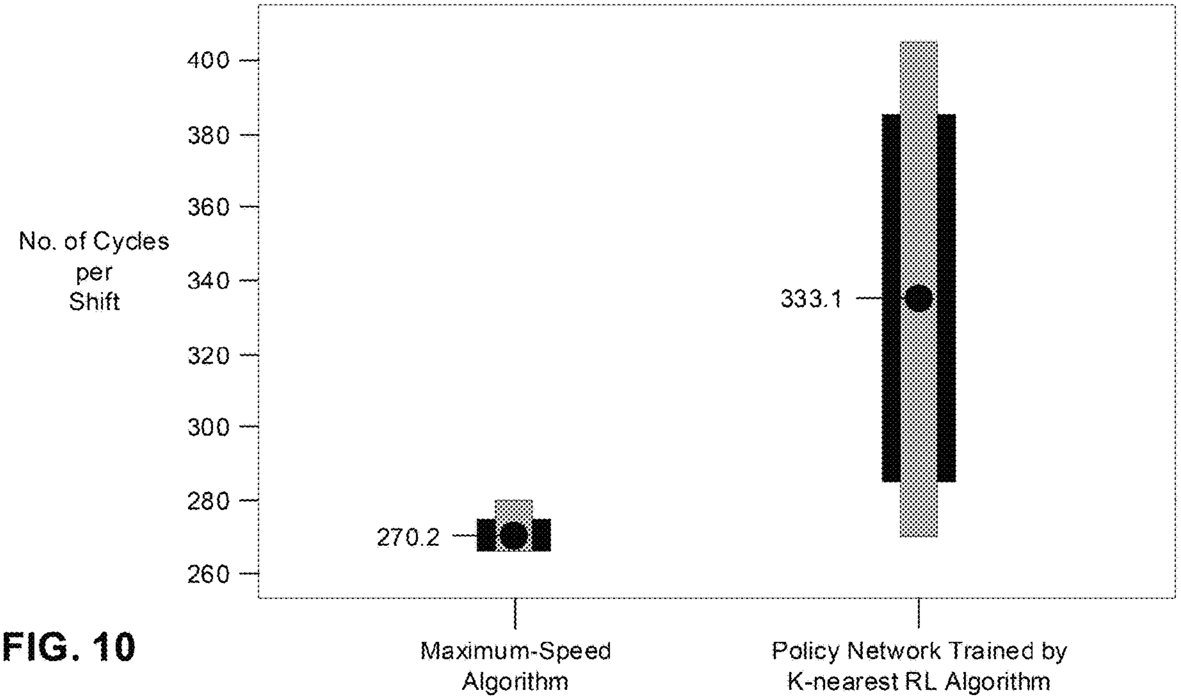
FIG. 10

K-NEAREST MULTI-AGENT REINFORCEMENT LEARNING FOR COLLABORATIVE TASKS WITH VARIABLE NUMBER OF AGENTS

BACKGROUND

Field of the Invention

The embodiments described herein are generally directed to controlling a plurality of agents, and, more particularly, to a k-nearest multi-agent reinforcement learning algorithm for controlling agents to perform collaborative tasks within an environment in which the number of agents may vary over time.

Description of the Related Art

Traditionally, the performance of multi-agent reinforcement learning algorithms are demonstrated and validated in gaming environments in which there are typically a fixed number of agents. However, in many industrial applications, the number of agents, operating in the industrial environment, is not fixed. For example, it is common for an agent to fail during operation and/or become unavailable for a period of time. An agent's failure during operation or an agent's return to operation after a maintenance or repair can abruptly change the number of operating agents. Moreover, a change in the production target can increase or decrease the number of operating agents in the industrial environment from one shift to the next. Therefore, before multi-agent reinforcement learning can be viably applied to industrial applications, the variability in the numbers of agents in industrial environments must be addressed.

SUMMARY

Accordingly, systems, methods, and non-transitory computer-readable media am disclosed for multi-agent reinforcement learning with a variable number of agents.

In an embodiment, a method for training a reinforcement learning policy network to control variable numbers of agents in an environment is disclosed, wherein the method comprises using at least one hardware processor to, in each of a plurality of training iterations: group a plurality of agents into a plurality of groups that each consist of k+1 agents by, for each of the plurality of agents, identifying a group comprising the agent and k nearest other ones of the plurality of agents to the agent, wherein k is a predetermined number, and excluding any redundant ones of the identified groups from the plurality of groups; use a batch of prior samples of prior groups from one or more prior training iterations to train a reinforcement learning policy network to determine actions for the k+1 agents in each of the plurality of groups based on observations of that group; for each of the plurality of groups, determine the actions for the k+1 agents in the group by applying the reinforcement learning policy network to the observations of that group; and, for each of the plurality of agents, when the agent belongs to a single one of the plurality of groups, select an action for the agent based on the action for that agent that was determined by applying the reinforcement learning policy network to observations of the single group, when the agent belongs to two or more groups, select an action for the agent based on the actions that were determined by applying the reinforcement learning policy network to observations of the two or more groups, and simulate control of the agent to execute the selected action.

A redundant one of the identified groups may be an identified group that consists of an identical set of k+1 agents as another identified group.

The reinforcement learning policy network may be trained using an off-policy deep reinforcement learning algorithm (e.g., a Soft Actor Critic (SAC) algorithm).

Selecting an action for the agent based on the actions that were determined by applying the reinforcement learning policy network to observations of the two or more groups may comprise calculating the action for the agent as a weighted average of the actions that were determined by applying the reinforcement learning policy network to observations of the two or more groups, wherein an action that was determined by applying the reinforcement learning policy network to observations of a first group that is closer to the agent than a second group is weighted higher than an action that was determined by applying the reinforcement learning policy network to observations of the second group.

Selecting an action for the agent based on the actions that were determined by applying the reinforcement learning policy network to observations of the two or more groups may comprise selecting only an action that was determined by applying the reinforcement learning policy network to observations of a group that is closest to the agent.

k+1 may be equal to a minimum possible number of agents in an environment in which the plurality of agents operate.

In an embodiment, k is greater than or equal to one and is less than one less than a number of the plurality of agents in the environment.

Each observation of a group may comprise a state of each of the k+1 agents in the group.

The batch may comprise a set of samples that have been randomly selected.

The method may further comprise using the at least one hardware processor to, in each of the plurality of training iterations: randomly select the set of samples in the batch from a replay buffer; and store a sample for each of the plurality of groups in the replay buffer; and Each sample in the batch may comprise actions determined for a respective one of the prior groups, observations of that prior group before execution of the actions determined for that prior group, rewards obtained by that prior group following execution of the actions determined for that prior group, and next observations of that prior group following execution of the actions determined for that prior group.

For each of the plurality of agents, the selected action may be executed in a digital twin of a real-world environment.

The method may further comprise using the at least one hardware processor to deploy the reinforcement learning policy network, as trained over the plurality of training iterations, to control a plurality of operational agents in a real-world environment.

The method may further comprise using the at least one hardware processor to, in each of a plurality of operational iterations, group the plurality of operational agents into a plurality of operational groups that each consist of k+1 operational agents by, for each of the plurality of operational agents, identifying an operational group comprising the operational agent and k nearest other ones of the plurality of operational agents to the operational agent, and excluding any redundant ones of the identified operational groups from the plurality of operational groups; for each of the plurality of operational groups, determine actions for the k+1 operational agents in the operational group by applying the deployed reinforcement learning policy network to observations of that operational group; and, for each of the plurality of operational agents, when the operational agent belongs to a single one of the plurality of operational groups, select an action for the operational agent based on the action for that operational agent that was determined by applying the deployed reinforcement learning policy network to observations of the single operational group, when the operational agent belongs to two or more operational groups, select an action for the operational agent based on the actions that were determined by applying the deployed reinforcement learning policy network to observations of the two or more operational groups, and control the operational agent to execute the selected action. Each of the plurality of operational agents may be an autonomous or semi-autonomous vehicle. Each of the plurality of operational agents may be a machine within an industrial process.

Any of the methods above may be embodied, individually or in any combination, in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 3 illustrates an example of k-nearest grouping, according to an embodiment;

FIG. 4 illustrates an example for calculating a distance between an agent and groups of which that agent is a member, according to an embodiment;

FIGS. 9 and 10 illustrate experimental results from operations of a policy network that has been trained by a k-nearest multi-agent reinforcement learning algorithm.

DETAILED DESCRIPTION

In an embodiment, systems, methods, and non-transitory computer-readable media are disclosed for multi-agent reinforcement earning with a variable number of agents. In particular, a multi-agent reinforcement learning algorithm is disclosed that is applicable to environments with variable numbers of agents. Embodiments of the algorithm are able to learn an optimal policy, even when there is action dependency between neighboring agents. Thus, embodiments of the algorithm are especially suitable for industrial applications with collaborative agents, where it is often impossible for an agent to make optimal decisions independently of other agents with which it has high levels of interaction.

After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview

1.1. Infrastructure

Figure 1:
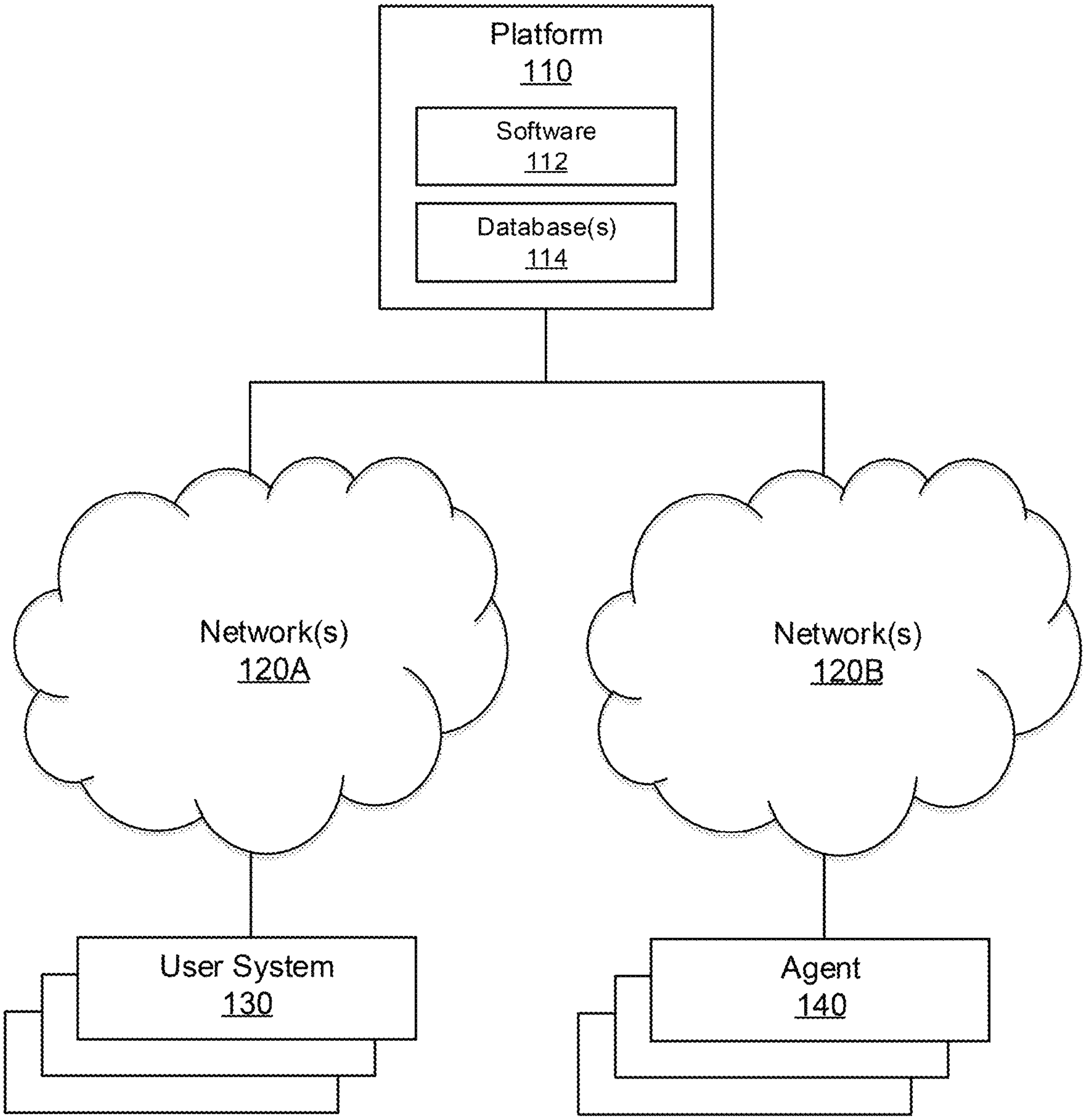
FIG. 1 illustrates an example infrastructure, in which one or more of the processes described herein, may be implemented, according to an embodiment.

FIG. 1 illustrates an example infrastructure in which one or more of the disclosed processes may be implemented, according to an embodiment. The infrastructure may comprise a platform 110 (e.g., one or more hardware servers) which hosts and/or executes one or more of the various functions, processes, methods, and/or software described herein. Platform 110 may comprise dedicated hardware servers, or may instead comprise cloud instances, which utilize shared resources of one or more hardware servers. These hardware servers or cloud instances may be collocated and/or geographically distributed. Platform 110 may host software 112 and/or one or more databases 114. In addition, platform 110 may be communicatively connected to one or a plurality of user systems 130 via one or more networks 120A and one or a plurality of agents 140 via one or more networks 120B. Although illustrated as separate and distinct, networks 120A and 12011 may be overlapping or coextensive with each other (e.g., the same).

Network(s) 120A and/or 120B may comprise the Internet, and platform 110 may communicate with user system(s) 130 and/or agent(s) 140 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. Alternatively or additionally, network(s) 120A and/or 120B may comprise an intranet, and platform 110 may communicate with user system(s) 130 and/or agent(s) 140 through the intranet using standard transmission protocols. In embodiments in which agents 140 are mobile (e.g., vehicles, robots, drones, etc.), network(s) 120B may comprise at least one wireless network as the last-mile network to which each agent 140 is connected. While only one platform 110 and a few user systems 130 and agents 140 are illustrated, it should be understood that the infrastructure may comprise any number of platforms 110, user systems 130, and agents 140.

User system(s) 130 may comprise any type or types of computing devices capable of wired and/or wireless communication, including without limitation, desktop computers, workstations, laptop computers, tablet computers, mobile phones (e.g., smartphones), servers, game consoles, televisions, set-top boxes, electronic kiosks, point-of-sale terminals, and/or the like. However, it is generally contemplated that user system(s) 130 would typically comprise a personal or work device that a user may utilize to configure one or more settings related to the training, deployment, and/or operation of the disclosed k-nearest multi-agent reinforcement learning algorithm.

Agent(s) 140 may comprise anything capable of being controlled according to the disclosed k-nearest multi-agent reinforcement learning algorithm. An agent may be a software agent or a hardware agent. A hardware agent may be any physical apparatus, such as a vehicle (e.g., an autonomous or semi-autonomous vehicle), robot, drone, satellite, machine (e.g., in a manufacturing process, assembly process, packaging and/or shipping process, other industrial process, etc.), conveyor, and/or the like. A software agent may be controlled by software 112 on platform 110 via communication (e.g., over network(s) 120B) with a control function of the software agent, whereas a hardware agent may be controlled by software 112 on platform 110 via communication (e.g., over network(s) 120B) with a controller of the hardware agent (e.g., a controller onboard the hardware agent, such as an Electronic Control Unit (ECU) in a vehicle).

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120A, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. It should be understood that platform 110 may also respond to other requests from user system(s) 130 (e.g., unrelated to the graphical user interface).

Platform 110 may further comprise, be communicatively coupled with, or otherwise have access to one or more database(s) 114. For example, platform 110 may comprise one or more database servers which manage one or more databases 114. A user system 130 or software 112 executing on platform 110 may submit data (e.g., user data, form data, hyperparameters, etc.) to be stored in database(s) 114, and/or request access to data stored in database(s) 114. Any suitable database may be utilized, including without limitation MySQL™, Oracle™, IBM™, Microsoft SQL™, Access™, PostgreSQL™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in software 112), executed by platform 110.

In embodiments in which a web service is provided, platform 110 may receive requests from one or more external systems, and provide responses in eXtensible Markup Language (XML), JavaScript Object Notation (JSON), and/or any other suitable or desired format. In such embodiments, platform 110 may provide an application programming interface (API) which defines the manner in which other systems may interact with the web service. Thus, the other systems (which may themselves be servers), can define their own user interfaces, and rely on the web service to implement or otherwise provide the backend processes, methods, functionality, storage, and/or the like, described herein.

1.2. Example Processing Device

Figure 2:
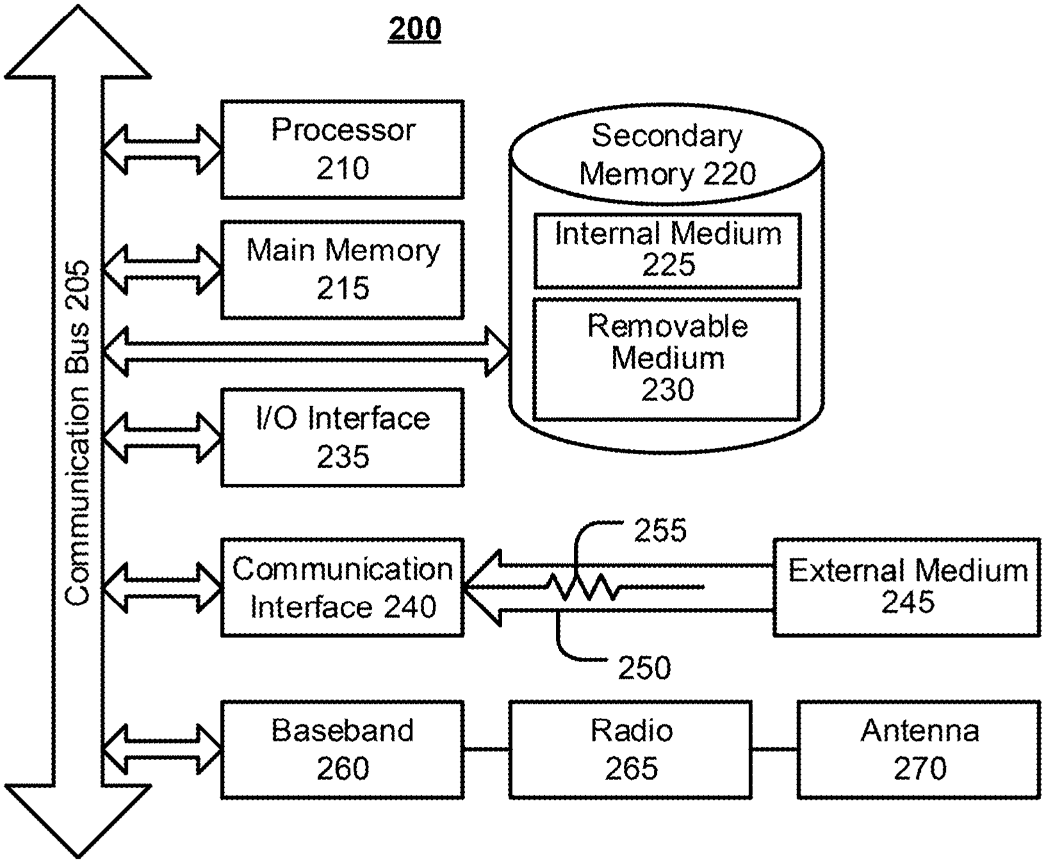
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods described herein (e.g., to store and/or execute software implementing those functions, processes, or methods), and may represent components of platform 110, user system(s) 130, agent(s) 140, and/or other processing devices described herein. System 200 can be a server, conventional personal computer or workstation, controller, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, and/or the like.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 200 preferably includes a main memory 215 and may also include a secondary memory 220. Main memory 215 provides storage of instructions and data for programs executing on processor 210, such as one or more software modules (e.g., constituting software 112) implementing one or more of the processes discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, another optical drive, a flash memory drive (e.g., solid-state drive (SSD)), and/or the like. Secondary memory 220 is a non-transitory computer-readable medium having computer-executable code (e.g., software 112) and/or other data stored thereon. The computer software or data stored on secondary memory 220 is read into main memory 215 for execution by processor 210.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 may include an external hard disk drive or SSD, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 240. Communication interface 240 allows software and data to be transferred between system 200 and a network (e.g., other nodes on network 120), external devices (e.g. printers), or other information sources and/or sinks. For example, software or executable code may be transferred to system 200 from a network server (e.g., platform 110) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer programs (e.g., computer-executable code implementing the disclosed software) are stored in main memory 215 and/or secondary memory 220. Computer programs can also be received via communication interface 240 and stored in main memory 215 and/or secondary memory 220. Such computer programs, when executed, enable system 200 to perform the various functions, methods, and processes of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing executable code, programming instructions, software, and/or other data to system 200.

In an embodiment that is implemented using software, the software may be stored on a computer-readable medium and loaded into system 200 by way of removable medium 230, I/O interface 235, and/or communication interface 240. In such an embodiment, the software is loaded into system 200 in the form of electrical communication signals 255. The software, when executed by processor 210, preferably causes processor 210 to perform one or more of the functions, methods, and processes described elsewhere herein.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

Some systems 200 may also include optional wireless communication components that facilitate wireless communication over a voice network and/or a data network (e.g., in the case of user system(s) 130 and/or agent(s) 140). The wireless communication components comprise an antenna system 270, a radio system 265, and a baseband system 260.

In system 200, radio frequency (RF) signals are transmitted and received over the air by antenna system 270 under the management of radio system 265. It should be understood that some systems disclosed herein (e.g., a server of platform 110) may have no need of wireless communication components, and therefore, may not possess such components.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information (e.g., in the case of a smartphone being used as user system 130), then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RE transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor(s) 210. Processor(s) 210 may have access to data storage areas 215 and 220. Processor(s) 210 are preferably configured to execute instructions (i.e., computer programs, such as the disclosed software) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions, methods, and processes of the disclosed embodiments.

2. Process Overview

Embodiments of processes for k-nearest multi-agent deep reinforcement learning with a variable number of agents will now be described in detail. It should be understood that the described processes may be embodied in one or more software modules that are executed by one or more hardware processors (e.g., processor 210), for example, as software 112. The described processes may be implemented as instructions represented in source code, object code, and/or machine code. These instructions may be executed directly by hardware processor(s) 210, or alternatively, may be executed by a virtual machine operating between the object code and hardware processors 210. In addition, the disclosed software may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

2.1. Introduction to Reinforcement Learning

In reinforcement learning algorithms, an agent 140 takes an action a and receives a reward r from an environment E. A reinforcement learning algorithm learns a policy $\Pi(a|s)$ that, for an agent 140 in state s, generates a set of one or more actions a that maximize the expected sum of rewards r that will be obtained by that agent 140 in environment E. A state s of an agent 140 may comprise one or more parameter values for that agent 140. The particular parameter(s) representing the state s of an agent 140 will depend on the particular application. A policy $\Pi$ may be implemented as a neural network, such as a deep neural network with a plurality of hidden layers, that accepts a state s as an input and outputs an action a. Thus, a policy may also be referred to herein as a "policy network."

In multi-agent reinforcement learning with collaborative agents 140, there are several agents 140 collaborating with each other in environment E. At each time step t, each agent i takes an action $a_i$ for a current state $s_i$. The goal of multi-agent reinforcement learning is to learn a policy $\Pi(a|s)$ for each agent 140 that generates a set of actions a for agents 140 in states s that maximizes the expected sum of the rewards r in environment E.

Many real-world problems are multi-agent problems. For the convenience of understanding, one example industrial application of multi-agent reinforcement learning will be referenced throughout the present disclosure. In particular, the present disclosure will frequently refer to the problem of traffic control in the mining industry. However, it should be understood that the disclosed embodiments may be applied to any industrial application, and therefore, are not limited to traffic control in the mining industry or any other particular industrial application.

When the number of agents 140 is small, the multi-agent problem can be modeled using a centralized approach in which a centralized policy Π is trained, using the joint observations of all agents 140, to produce a joint set of actions a. It should be understood that an observation of an agent 140 comprises the current state s of that agent 140. In a centralized approach, a single policy network is used to generate al of the agents' actions a based on the global observations of all of agents 140. Therefore, a centralized approach can achieve an optimal policy even when there is action dependency (i.e., the actions a of agents 140 are interdependent).

For example, in the traffic control problem, assume there are a number of trucks operating in a mine, and the goal is to set a target speed for each truck that maximizes production in the mine. In this problem, each truck is an agent 140, and the mine is environment E. In the centralized approach, the policy Π uses all of the observations of agents 140 to determine the actions a of agents 140. In this example, each observation, representing the current state s of a particular truck as an agent 140, may comprise the current speed of the truck, the current location of the truck, the distance between the truck and its current goal (e.g., load location or dump location), the distance between the truck and its prior stop (e.g., dump location or load location), the time elapsed since the truck left its prior stop, and/or the like. In addition, in this example, each action a may be a target speed of the truck.

As should be apparent, a centralized approach does not scale well for many applications, since the observation and action spaces will quickly expand to very large dimensions as the number of agents 140 increases. Moreover, a centralized approach is not practical for applications in which the number of agents 140 is not constant. In many real-world, industrial applications, the number of agents 140 can change based on product demand, scheduled maintenance and repairs, unexpected breakdowns or other failures, operator availability, and/or the like. For example, in the traffic control problem, a new truck may join the mine in the middle of a shift, or a truck may fail during a shift. A centralized reinforcement learning algorithm considers the global observation space as the union of the observations of agents 140 and generates actions a for all agents 140 simultaneously. Therefore, such an algorithm assumes that the number of agents 140 is fixed. The removal of an agent 140 leaves a hole in the policy network, and no agents 140 can be added during an episode. This is impractical for many industrial applications.

A trivial solution to this problem of variability in the number of agents 140—referred to herein as agent variability—would be to learn a different policy Π for each different potential number of agents 140. In this case, whenever the number of agents 140 changes, the policy Π associated with the new number of agents 140 could be enacted. However, the range in possible numbers of agents 140 can vary widely in an industrial application. It is expensive and infeasible to train and update models for all potential numbers of agents 140, especially for large systems with hundreds of agents 140. In other words, this solution to agent variability would create a model management problem.

In a decentralized approach, an autonomous learner is used for each agent 140. An example of an autonomous learner is an independent deep-Q-network (IDQN), which distinguishes agents by identities. To some extent, the use of autonomous learners addresses the challenges of large action spaces and agent variability. However, such an approach suffers from the point of view of convergence, as the environment E becomes non-stationary. In fact, the decentralized reinforcement learning algorithm models other agents 140 as part of the environment E. Therefore, during training, the policy Π for each agent 140 must chase moving targets as the other behaviors of other agents 140 change during training.

Furthermore, in an IDQN framework, each agent 140 must take actions a independently from the actions a taken by the other agents 140. Therefore, unlike a centralized reinforcement learning algorithm, the IDQN framework cannot achieve an optimal policy when an optimal action a for an agent 140 depends on the actions a of other agents 140. This limits the performance of the IDQN framework in many collaborative industrial applications, since each agent 140 may interact with other agents 140 and must consider the behavior of these other agents 140 in its decision-making, in order to maximize overall performance. For example, in the traffic control problem, the optimal target speed for each truck depends on the target speed of nearby trucks. Therefore, an optimal policy Π cannot be set for each truck in the IDQN framework, since the target speed of each truck is set independently.

In addition, in practice, it can be difficult to train and maintain a separate policy Π for each agent 140, especially in large-scale industrial applications with hundreds of agents 140. For example, in a mine with a maximum of fifty trucks, the IDQN framework would require fifty policies Π to be trained and maintained. This can be time consuming and expensive.

To address the convergence problem, hybrid approaches have been proposed that combine centralized learning with decentralized execution. For example, Lowe et al., in "Multi-Agent Actor Critic for Mixed Cooperative-Competitive Environments," Advances in Neural Information Processing Systems, pp. 6379-6390 (2017), which is hereby incorporated herein by reference, proposed a multi-agent deep deterministic policy gradient (MADDPG), which includes a centralized critic network and decentralized actor networks for the agents. Sunehag et al, in "Value Decomposition Networks for Cooperative Multi-Agent Learning Based on Team Reward," Autonomous Agents and Multi-agent Systems (AAMAS), pp. 2085-2087 (2018), which is hereby incorporated herein by reference, proposed a linear additive value decomposition approach, in which the total Q-value is modeled as a sum of the Q-values for the individual agents. Rashid et al., in "QMIX: Monotonic Value Function Factorization for Deep Multi-Agent Reinforcement Learning," arXiv preprint arXiv:1803.11485 (2018), which is hereby incorporated herein by reference, proposed the QMIX network, which allows for a richer mixing of Q agents than the linear additive value decomposition proposed by Sunehag et al. Although these hybrid approaches have shown promising results in many applications, they possess the same limitations as centralized approaches when it comes to industrial applications in which the numbers of agents 140 may not be constant. In addition, since the execution is decentralized, these hybrid approaches cannot solve multi-agent problems in which the optimal action a for an agent 140 depends upon the actions a of other agents 140.

Foerster et al., in "Learning to Communicate with Deep Multi-Agent Reinforcement Learning," Advances in Neural Information Processing Systems, pp. 2137-2145 (2016), which is hereby incorporated herein by reference, proposed a single policy network with shared parameters to reduce the number of learned parameters and speed up the learning process. To some extent, having a shared policy Π among agents 140 addresses the challenges posed by agent failure and a non-stationary environment E. Foerster et al, also disabled experience replay to further reduce the problem posed by a non-stationary environment E. Experience replay uses the same sample multiple times during training to improve sample efficiency. A single policy Π with shared parameters also solves the model management problem, since only one model is trained and maintained for all of agents 140. However, like the decentralized and hybrid approaches, this approach cannot achieve an optimal policy Π when the optimal action a for an agent 140 depends upon the actions a of other agents 140.

For at least the reasons explained above, multi-agent reinforcement learning algorithms have not been previously applied to industrial applications at a meaningful scale. The disclosed k-nearest multi-agent reinforcement learning algorithm is designed to change this by addressing the challenges posed by the potential variability in the number of agents 140, the potential action dependencies between agents 140, model management, and a non-stationary environment E during training. By addressing these challenges, the disclosed k-nearest multi-agent reinforcement learning algorithm can be viably applied to industrial applications. The table below summarizes the problems addressed by each of prior approaches, along with the disclosed K-nearest multi-agent reinforcement learning algorithm:

| Approach | Agent Variability | Non-Stationary Environment | Action Dependency | Model Management | Training Cost |
|---|---|---|---|---|---|
| Centralized | No | Yes | Yes | Yes | Yes |
| Hybrid | No | Yes | No | Yes | Yes |
| Decentralized | Yes | No | No | No | No |
| Decentralized with weight-sharing | Yes | Yes | No | Yes | Yes |
| Disclosed K-nearest Multi-Agent RL Algorithm | Yes | Yes | Yes | Yes | Yes |

As is evident from this summary, prior approaches required a trade-off between agent variability and action dependency. On one hand, centralized approaches can address action dependency (i.e., the optimal action for one agent 140 depends on the actions of other agents 140), but not agent variability (i.e., varying numbers of agents 140). On the other hand, decentralized approaches can address agent variability, but not action dependency. In contrast, the disclosed algorithm addresses both agent variability and action dependency.

2.2. K-Nearest Agents

Generally, in industrial applications with collaborative agents 140, the optimal action for an agent 140 is highly dependent upon the actions of agents 140 with which it interacts, but not highly dependent upon the actions of agents 140 with which it does not interact. For example, in the traffic control problem, the optimal speed for a truck can be dramatically impacted by a change in the speed of a nearby truck, but will not be significantly impacted by a change in the speed of a truck on the other side of the mine. The disclosed algorithm leverages this localization of interactivity to address action dependency when it matters, while avoiding the challenges that come with centralized solutions.

In particular, the disclosed algorithm finds the k-nearest agents 140 to each agent 140 to produce groups of agents 140, and then generates the actions for each group based on a common policy network. The value k, representing one less than the number of agents 140 in each group (i.e., each group consists of k+1 agents 140), will depend upon the particular application. In general, the value of k+1 should represent the minimum number of agents 140 that may be operational in an environment at any given time and/or the value of k should represent the number of other agents 140 with which an agent 140 will typically interact. For example, in the traffic control problem in which trucks are agents 140, k=4 tends to be a good value for k, since the mine cannot operate efficiently with fewer than five trucks and a truck is generally interacting with, at most, four other trucks.

The metric by which to measure the distance between two agents 140 will depend upon the application, but will generally represent the level of interaction between the two agents (e.g., a shorter distance represents higher interactivity, and a longer distance represents lower interactivity). For example, in the traffic control problem, the distance metric may be the traveling distance between the two trucks. In a production line, in which machines are agents 140, the distance metric between two machines may be defined as the time it takes a product to travel between the two machines.

After grouping a number N of agents 140 with their k-nearest agents 140 and removing redundant groups, there will be m unique groups of agents 140. A redundant group may be defined as a group that consists of an identical set of agents 140 as another group. Each of the m groups will consist of k+1 agents 140. FIG. 3 illustrates an example of k-nearest grouping, in which N=13 and k=4, according to an embodiment. After the k-nearest grouping, there are m=3 groups, designated as Group A, Group B, and Group C.

It should be understood that m at any given time will depend on the particular arrangement of agents 140 at that time, and may change over time as the distances between agents 140 change. The lower and upper bounds of the number m of groups may be expressed as follows:

$$\left\lceil \frac{N}{k+1} \right\rceil \leq m \leq N$$

wherein $\lceil \bullet \rceil$ is the ceiling function that outputs the smallest integer that is greater than or equal to the input, such that $$\left\lceil \frac{N}{k+1} \right\rceil$$

represents the smallest integer that is greater than or equal to $$\frac{N}{k+1},$$

2.3. Weight Sharing

As illustrated in FIG. 3, during operation of policy network Π, the collective group observations from agents 140 in each group may be input to policy network Π. Since all groups consist of the same number, k+1, of agents 140, policy network Π may have k+1 outputs. In particular, the output of policy network Π for a group observation may comprise an action for each agent 140 in the group. Consequently, since there are k+1 agents in each group, policy network Π outputs k+1 actions for each input.

For example, for Group A, the collective $\text{Observations}_A$ from Agents 1, 2, 3, 4, and 5 in Group A are provided as an input to policy network Π to produce $\text{Actions}_A$, consisting of five actions (i.e., a first action for Agent 1, a second action for Agent 2, a third action for Agent 3, a fourth action for Agent 4, and a fifth action for Agent 5). Similarly, for Group B, the collective $\text{Observations}_B$ from Agents 5, 6, 7, 8, and 9 in Croup B are provided as an input to policy network Π to produce $\text{Actions}_B$, consisting of five actions (i.e., a first action for Agent 5, a second action for Agent 6, a third action for Agent 7, a fourth action for Agent 8, and a fifth action for Agent 9). For Group C, the collective $\text{Observations}_C$ from Agents 9, 10, 11, 12, and 13 in Group C are provided as an input to policy network Π to produce $\text{Actions}_C$, consisting of five actions (i.e., a first action for Agent 9, a second action for Agent 10, a third action for Agent 11, a fourth action for Agent 12, and a fifth action for Agent 13).

Each of the groups use the same policy network Π. (The weights of the neural network, implementing policy network Π, are shared by all agents 140 within a group) [illegible], but may differ between different groups. This weight sharing addresses the problem of model management. In particular, since a single policy network Π is shared by all groups of agents 140, the model is easy to train and maintain. At the same time, since the policy network Π is trained and operated on collective observations from groups of k-nearest agents 140, the model accounts for action dependency by collectively selecting optimal actions for groups of each agent 140 and its k-nearest agents 140. Notably, a centralized algorithm is a special case of the disclosed k-nearest multi-agent reinforcement learning algorithm in which k=N−1, and a decentralized algorithm is a special case of the disclosed k-nearest multi-agent reinforcement learning algorithm in which k=0.

2.4. Post-Processing

Notably, in FIG. 3, Agents 5 and 9 each belong to two groups. In particular, Agent 5 belongs to both Group A and Group B, and Agent 9 belongs to both Group B and Group C. More generally, an agent 140 may be a member of one group or a plurality of groups, including two, three, or more groups. In addition, although not illustrated, a group may overlap with no other group or may overlap with one or a plurality of groups to share one or a plurality of agents 140.

In the event that an agent 140 belongs to a plurality of groups, the action to be taken by that agent 140 may be derived by post-processing that takes into account all of the actions output for that agent 140. For example, for Agent 5, the post-processing will receive the action $a_{A5}$, output by policy network Π for Agent 5 based on $\text{Observations}_A$, and the action $a_{B5}$, output by policy network Π for Agent 5 based on $\text{Observations}_B$, and will use those two inputs to determine and output a final action $a_5$ to be taken by Agent 5. Similarly, for Agent 9, the post-processing will receive the action $a_{B9}$, output by policy network Π for Agent 9 based on $\text{Observations}_B$, and the action $a_{C9}$, output by policy network Π for Agent 9 based on $\text{Observations}_C$, and will use those two inputs to determine and output a final action $a_9$ to be taken by Agent 9. The post-processing may derive the final action from the input actions using any suitable aggregation strategy for the particular application.

For example, in an embodiment, the post-processing comprises calculating a weighted average of the input actions. The weights may be determined based on distances between the agent 140 and each of the groups of which that agent 140 is a member. FIG. 4 illustrates how these distances may be calculated for Agent 5 in FIG. 3, according to an embodiment. In particular, the distance between an agent 140 and a group may be calculated as the sum of the distances between that agent 140 and every other agent 140 in that group. In this case, the distance of Agent 5 from the rest of Group A may be calculated as $d_A=d_1+d_2+d_3+d_4$ and the distance of Agent 5 from the rest of Group B may be calculated as $d_B=d_6+d_7+d_8+d_9$. Assuming $d_A>d_B$, the input actions should be weighted by post-processing so that action $a_{B5}$ is weighted higher than action $a_{A5}$.

For a discrete action with a finite number of possibilities (e.g., move up, down, right, or left), the weights may either be "1" for the input action that was output by policy network Π for that agent 140 as a member of the closest group, and "0" for any input actions that were output by policy network Π for that agent 140 as a member of the non-closest group(s). In other words, the action derived for the agent 140 for the closest group is selected as the final action, to the exclusion of any other actions derived for that agent 140. Returning to FIGS. 3 and 4, assuming input actions $a_{A5}$ and $a_{B5}$ are discrete actions and $d_A>d_B$, the post-processing would select input action $a_{B5}$ as final action $a_5$, to the exclusion of action $a_{A5}$.

For a continuous action that may take any value within a range (e.g., move 10.5 yards at a direction of 38.1 degrees), the weights may be determined for the input actions so that they are proportional to the distances between the agent 140 and the groups, with closer groups weighted higher than further groups. For example, the weight assigned to each group-specific input action, output by policy network Π for a specific group, may be a difference between the total distance between that particular agent 140 and all of the groups of which the particular agent 140 is a member and the total distance between that particular agent 140 and the other k agents 140 in that specific group, divided by the total distance between that particular agent 140 and all of the groups of which that particular agent 140 is a member. The final action to be taken by that particular agent 140 may then be determined based on or according to the weighted average. Returning to FIGS. 3 and 4, assuming input actions $a_{A5}$ and $a_{B5}$ are continuous actions, the post-processing would determine the final action $a_5$ as:

$$a_5 = \frac{\sum d - d_A}{\sum d} a_{A5} + \frac{\sum d - d_B}{\sum d} a_{B5} = \frac{(d_A + d_B) - d_A}{(d_A + d_B)} a_{A5} + \frac{(d_A + d_B) - d_B}{(d_A + d_B)} a_{B5}$$

$$= \frac{d_B}{(d_A + d_B)} a_{A5} + \frac{d_A}{(d_A + d_B)} a_{B5}$$

Figure 5:
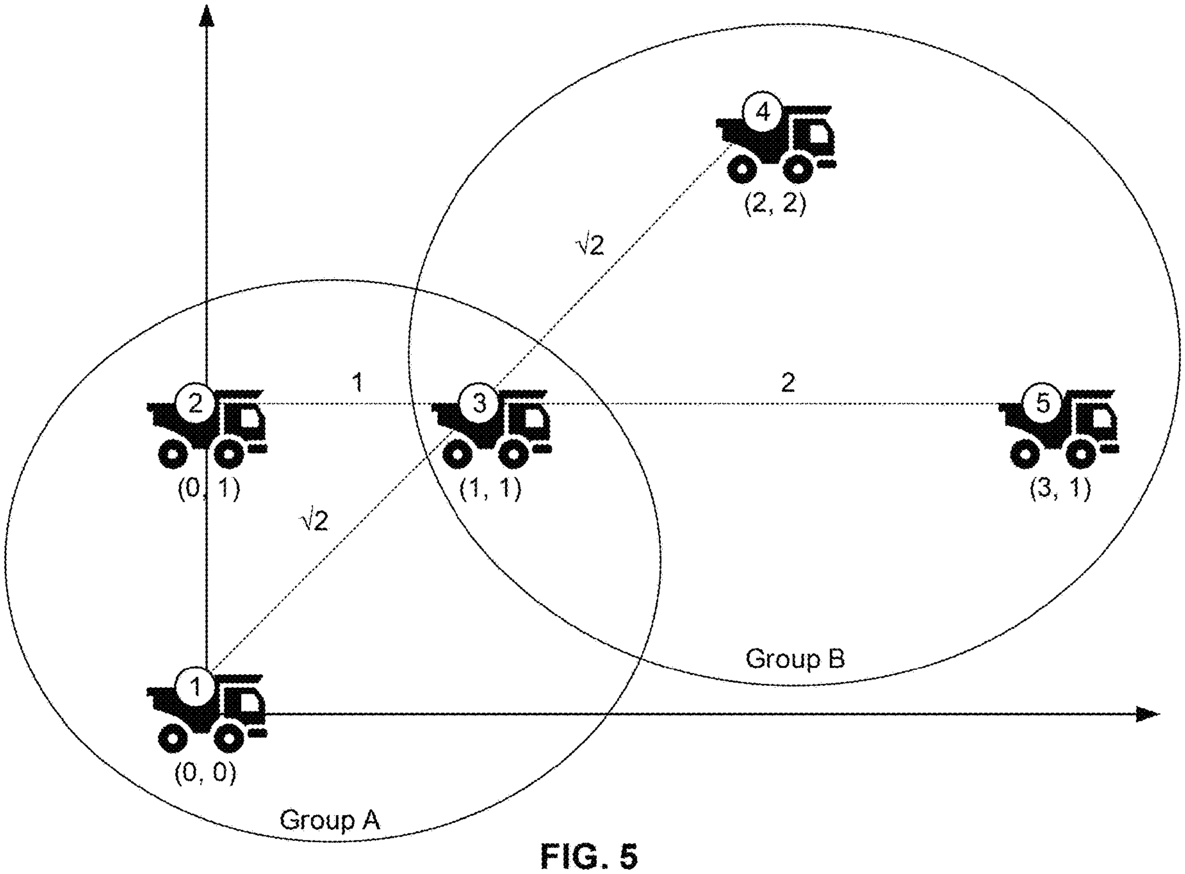
FIG. 5 illustrates an example of post-processing in a traffic control problem, according to an embodiment.

FIG. 5 illustrates an example of specific post-processing for continuous actions in the traffic control problem, according to an embodiment. In this simple example, N=5, k=2, and the actions output by policy network Π are target speeds v. Since Truck 3, as an agent 140, belongs to both Group A and Group B, policy network Π will output both a target speed $v_{A3}$ for Truck 3, due to its membership in Group A, and a target speed $v_{B3}$ for Truck 3, due to its membership in Group B. The distance $d_A$ between Truck 3 and the other trucks in Group A is the sum of the distance between Truck 3 and Truck 1 and the distance between Truck 3 and Truck 2. Thus, $d_A=\sqrt{2}+1$. Similarly, the distance $d_B$ between Truck 3 and the other trucks in Group B is the sum of the distance between Truck 3 and Truck 4 and the distance between Truck 3 and Truck 5. Thus, $d_B=\sqrt{2}+2$. Consequently, the final target speed $v_3$ for Truck 3 may be determined by the post-processing as:

$$v_3 = \frac{d_B}{(d_A+d_B)}v_{A3} + \frac{d_A}{(d_A+d_B)}v_{B3} = \frac{\sqrt{2}+2}{2\sqrt{2}+3}v_{A3} + \frac{\sqrt{2}+1}{2\sqrt{2}+3}v_{B3} \approx 0.59v_{A3} + 0.41v_{B3}$$

Thus, the target speed $v_{A3}$ is weighed higher than the target speed $v_{B3}$, because Truck 3 is closer to Group A than Group B. As an example, if $v_{A3}$=30 mph and $v_{B3}$=60 mph, the final action for Truck 3 would be to set the target speed of Truck 3 to $v_3$=42 mph.

2.5. Off-Policy Training

In an embodiment, the k-nearest multi-agent reinforcement learning algorithm may utilize an off-policy algorithm during training to learn policy network Π. In order to support an off-policy algorithm, samples may be persistently stored in a replay buffer, as they are acquired, for the duration of a training session. Each sample may comprise, for one of the plurality of groups processed during the training session, the observations (e.g., states) of all of the k+1 agents 140 in that group, the actions determined by policy network Π for and taken by all of the k+1 agents 140 in that group, the reward obtained from those actions by all of k+1 agents 140 in that group, and the subsequent observations (e.g., states) of all of the k+1 agents 140 in that group. In an embodiment, the reward in each sample is the total reward obtained by all of the k+1 agents 140 in the group. This will train the policy network Π to encourage agents 140 to collaborate with other agents 140 in their groups in order to maximize the common profit. All of the samples acquired throughout a training session may be stored in the replay buffer, even though the distances between agents 140 and the numbers and constitutions of the groups will change across iterations of the training session.

During the off-policy training session, the samples and weights from different groups are shared. The idea is to learn a policy network Π that generates an optimal solution for any group of k+1 nearby agents 140. In an embodiment, the Soft Actor Critic (SAC) algorithm may be used as the off-policy training algorithm. The SAC algorithm is described by Haarnoja et al. in "Soft Actor-Critic: Off-Policy Maximum Entropy Deep Reinforcement Learning with a Stochastic Actor," Int'l Conference on Machine Learning, pp. 1861-1870, Proceedings of Machine Learning Research (2018), which is hereby incorporated herein by reference. The SAC algorithm uses maximum entropy to improve robustness as the k-nearest multi-agent reinforcement learning algorithm learns the policy network Π from each sample. The SAC algorithm is capable of achieving state-of-the-art performance on benchmarks for various continuous action spaces. In addition, the SAC algorithm is very stable, and its performance does not change significantly across different training episodes. However, it should be understood that the disclosed algorithm is not dependent upon the SAC algorithm, and that any other off-policy reinforcement learning algorithm may be used to train the policy network Π.

2.6. Agent Variability

Figure 6:
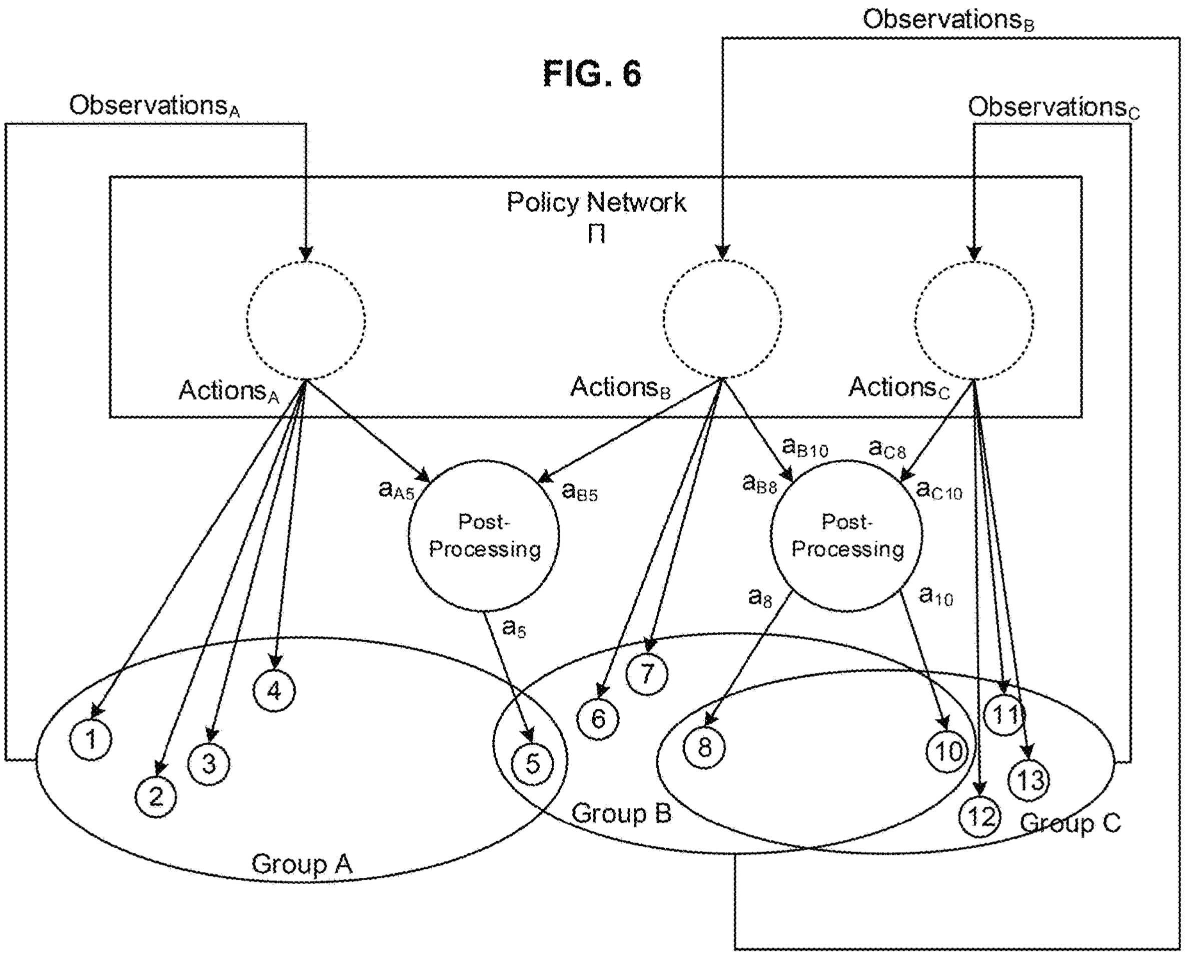
FIG. 6 illustrates an example of k-nearest grouping after an agent fails during operation, according to an embodiment.

The disclosed k-nearest multi-agent reinforcement learning algorithm can handle variability in the number of agents during operation. For example, FIG. 6 illustrates an example in which Agent 9 from FIG. 3 fails during operation, according to an embodiment. With the failure of Agent 9, N decreases from 13 to 12. The number m of groups remains 3. However, the constitutions of some of the groups has changed. In particular, Group B adds Agent 10, and Group C adds Agent 8, so that all groups retain k+1 agents 140. In other words, the number of agents in each group is fixed. While the value of m did not change in this example, it should be understood that the value of m may change as the number of agents 140 changes, and that the constitutions of the groups may change more dramatically than Illustrated in this example, such that there may not be any clear correspondence between groups in a current iteration and groups in a past iteration of training or operation. This ability of the algorithm to reorganize the groups, dynamically as needed, addresses the problem of agent variability over time.

Notably, in this example, because Agents 8 and 10 both belong to two groups (i.e., Groups B and C), their actions are both post-processed as described elsewhere herein. In particular, for Agent 8, the post-processing derives a final action $a_8$ for Agent 8 based on the input action $a_{B8}$, output by the policy network Π based on $\text{Observations}_B$, and the input action $a_{C8}$, output by the policy network Π based on $\text{Observations}_C$. Similarly, for Agent 10, the post-processing derives a final action $a_{10}$ for Agent 10 based on the input action $a_{B10}$, output by the policy network Π based on $\text{Observations}_B$, and the input action $a_{C10}$, output by the policy network Π based on $\text{Observatkns}_C$.

2.7. K-Nearest Multi-Agent Reinforcement Learning Algorithm

Figure 7:
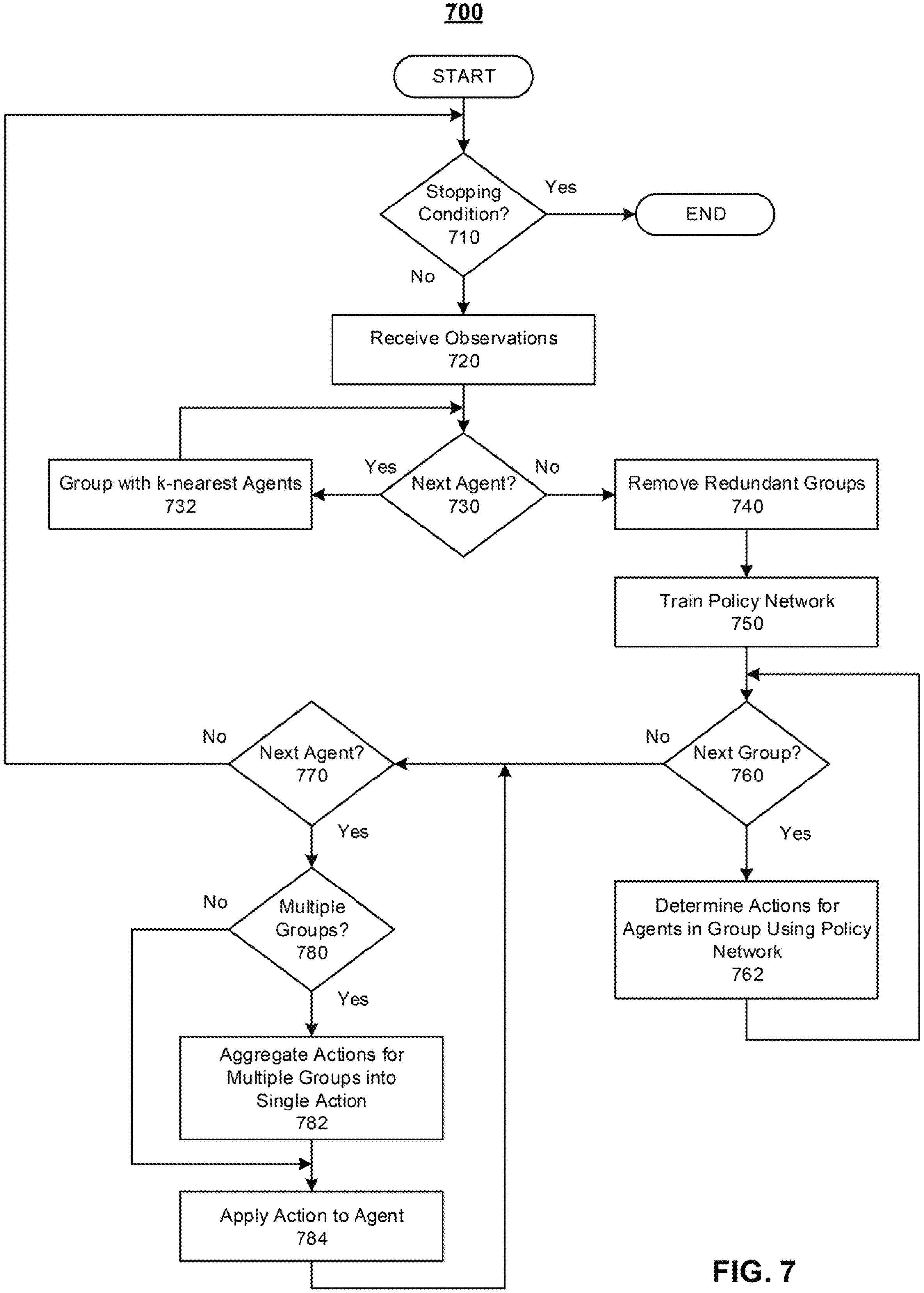
FIG. 7 illustrates an example of a k-nearest multi-agent reinforcement learning algorithm, according to an embodiment.

FIG. 7 illustrates an example of the overall k-nearest multi-agent reinforcement learning algorithm 700, according to an embodiment. Algorithm 700 may be implemented by software 112 on platform 110 to produce a trained policy network Π that can be deployed to control a plurality of agents 140 for an industrial application in a real-world environment. Although the description of algorithm 700 will refer to agents 140, it should be understood that algorithm 700 will generally operate on simulations of the agents 140 in a simulated environment, rather than the actual agents 140 (e.g., software or physical agents 140) in the real-world environment.

Algorithm 700 iterates until a stopping condition is satisfied in subprocess 710. A simple stopping condition would be the number of iterations reaching a threshold value. A more complex stopping condition may consider an accuracy or error metric of the trained policy network Π. It should be understood that any suitable stopping condition for reinforcement learning, known in the art, may be used as the stopping condition in subprocess 710. If the stopping condition is satisfied (i.e., "Yes" in subprocess 710), algorithm 700 ends. Otherwise, if the stopping condition is not satisfied (i.e., "No" in subprocess 710), algorithm 700 proceeds to subprocess 720.

In subprocess 720, observations are received &om al of the plurality of agents 140. Each observation of an agent 140 represents the state of that agent 140. The state of the agent 140 may comprise one or more current parameters of the agent 140. Since algorithm 700 operates on simulated agents 140 in a simulated environment, the observations may be received from the simulation software, which may itself be hosted on the same system as algorithm 700 (e.g., platform 110). Alternatively, algorithm 700 and the simulation software may be hosted on separate systems and communicate via a network communicatively connecting the two systems. In this case, algorithm 700 may communicate with the simulation software via an API provided by the simulation software, and/or the simulation software may communicate with algorithm 700 via an API provided by software 112 implementing algorithm 700.

Subprocess 730 iterates over each and all of the plurality of agents 140 in the environment. If a next agent 140 remains to be considered (i.e., "Yes" in subprocess 730), algorithm 700 proceeds to subprocess 732. Otherwise, if no agents 140 remain to be considered (i.e., "No" in subprocess 730), algorithm 700 proceeds to subprocess 740. As discussed elsewhere herein, due to agent variability, the number of agents 140 may change from iteration to iteration. Only those agents which are operational during the current iteration are considered in subprocess 730.

In subprocess 732, the k-nearest agents 140 to the current agent 140 under consideration are identified based on the particular distance metric being used. The identified k-nearest agents 140 are combined with the current agent 140 into a group of k+1 agents 140. Thus, over iterations of subprocesses 730 and 732, a plurality of groups are created, with each group consisting of k+1 agents 140. In particular, if there are N agents 140, the iterations of subprocesses 730 and 732 will produce N groups (i.e., one group for each agent 140).

In subprocess 740, redundant groups are removed. A redundant group may be defined as a group that consists of an identical set of k+1 agents 140 as another group. While subprocess 740 is illustrated as occurring after all of the iterations of subprocess 730 have been completed, subprocess 740 may be implemented within the loop formed by subprocesses 730 and 732, such that redundant groups are discarded as they are encountered. For example, a representation of each unique group (e.g., a set of identifiers for the k+1 agents 140 in the group) may be stored for further processing after each iteration of subprocess 732 that produces that unique group, whereas no representation of a redundant group is stored after an iteration of subprocess 732 that produces that redundant group. In any case, the result will be m unique groups that each consist of k+1 agents 140. As discussed elsewhere herein, the number of groups and the memberships of groups may change from iteration to iteration, since the distances between agents 140 and/or the numbers of agents 140 may change between iterations.

In subprocess 750, the policy network Π is trained. The policy network Π may be trained using an off-policy algorithm, such as the SAC algorithm In particular, a batch of samples may be retrieved from a replay buffer that stores samples from prior iterations. This batch of samples is used to train the policy network Π. Each sample may comprise, for one of the plurality of groups processed in a prior iteration t, the observations $s_t$ of all of the k+1 agents 140 in that group, the actions $a_t$ determined by policy network Π for and taken by al of the k+1 agents 140 in that group, the reward r obtained from those actions by all of k+1 agents 140 in that group, and the subsequent observations $s_{t+1}$ of all of the k+1 agents 140 in that group. The reward r in each sample may be the total reward obtained by all of the k+1 agents 140 in the respective group, to encourage collaboration among agents 140 within the group. It should be understood that the replay buffer may be empty in the first iteration of algorithm 700, in which case, no actual training is performed in subprocess 750.

Subprocess 760 iterates over each and all of the m groups. If a next group remains to be considered (i.e., "Yes" in subprocess 760), algorithm 700 proceeds to subprocess 762. Otherwise, if no groups remain to be considered (i.e., "No" in subprocess 760), algorithm 700 proceeds to subprocess 770.

In subprocess 762, the current policy network Π is applied to the current observations of the current group of k+1 agents 140 under consideration to determine actions for each of the k+1 agents 140. The action determined for each of the k+1 agents 140 in a given group may be, but does not have to be, different than the actions of one or more other ones of the k+1 agents 140 in the given group, depending on the policy network Π. Over iterations of subprocess 760 and 762, actions are determined for each of the k+1 agents 140 in each of the m groups. It should be understood that if a particular agent 140 is a member of two or more groups, a plurality of actions will be determined for that particular agent 140. The plurality of actions will consist of one action for each of the two or more groups.

Subprocess 770 iterates over each of the plurality of agents 140 in the current iteration of algorithm 700. If a next agent 140 remains to be considered (i.e., "Yes" in subprocess 770), algorithm 700 proceeds to subprocess 780. Otherwise, if no agents 140 remain to be considered (i.e., "No" in subprocess 770), algorithm 700 returns to subprocess 710 to perform another iteration (unless the stopping condition is satisfied).

Subprocess 780 determines whether the current agent 140 under consideration is a member of multiple groups. If the agent 140 is a member of multiple groups (i.e., "Yes" in subprocess 780), algorithm 700 proceeds to subprocess 782. Otherwise, if the agent 140 is a member of only one group (i.e., "No" in subprocess 780), algorithm 700 proceeds to subprocess 784.

In subprocess 782, the actions determined for each of the plurality of groups of which the current agent 140 is a member are aggregated into a single final action. For example, as discussed elsewhere herein, the actions may be input into and aggregated by post-processing which selects the final action based cx the input actions and the distances between the current agent 140 and the other members in each of the plurality of groups of which the current agent 140 is a member. In an embodiment, the aggregation is a weighted average that weights closer groups higher than farther groups. For discrete actions, the final action may be selected as the input action determined for the closest group (e.g., by weighting that input action with 1, and weighting all other input actions with 0). As discussed elsewhere herein, the metric used as the distance will depend on the particular application. For instance, in the traffic control problem, the distance metric may be a traveling distance between trucks.

In subprocess 784, the final action determined for the current agent 140 is applied to the current agent 140. This final action may be the action determined in subprocess 762 for agents 140 that are members of only a single group or the aggregate action determined in subprocess 782 for agents 140 that are members of multiple groups. It should be understood that, during a training session, the agents 140 are simulated in a simulated environment. Thus, the application of an action in subprocess 784 may comprise controlling the simulated agent 140 to perform the action in the simulated environment.

K-nearest multi-agent reinforcement learning algorithm 700 can be applied to any multi-agent problem in which the distance between agents 140 is a suitable proxy for the interactivity between agents 140. For instance, in any traffic control problem, nearby vehicles will tend to have higher impacts on each other than very distant vehicles.

2.8. Operation of Trained Policy Network

Figure 8:
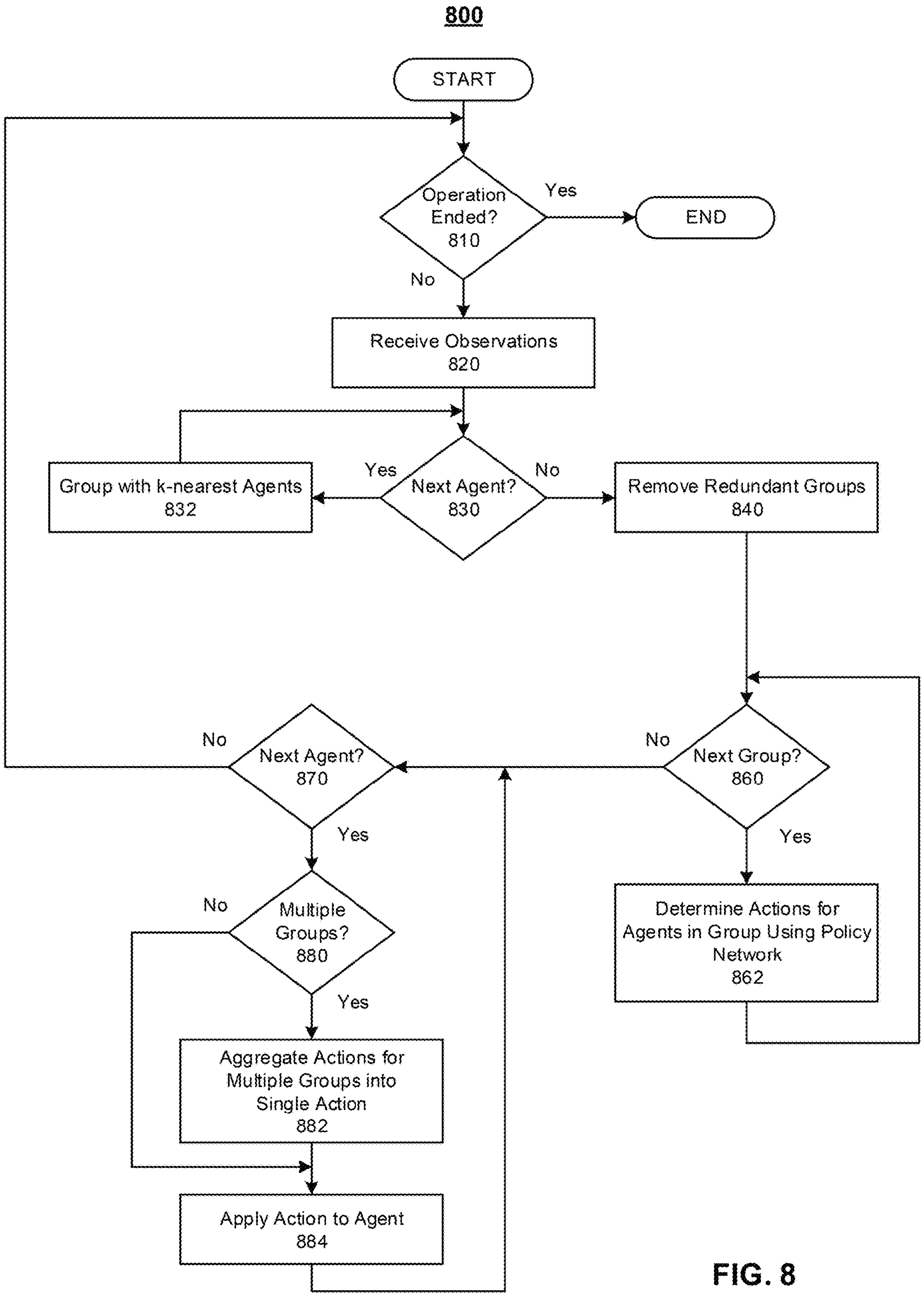
FIG. 8 illustrates an operation of a policy network that has been trained by a k-nearest multi-agent reinforcement learning algorithm, according to an embodiment.

Once the policy network Π has been trained over a plurality of iterations of subprocess 750 in algorithm 700, it may be deployed to operate with actual (e.g., non-simulated, physical) agents 140 in a real-world environment. FIG. 8 illustrates an operation 800 of the trained policy network Π, according to an embodiment. Operation 800, along with policy network Π, may be implemented in software 112 that is hosted on platform 110 and used to control agents 140 over network(s) 120B. Operation 800 is similar to algorithm 700, except that the policy network Π no longer needs to be trained. In addition, whereas algorithm 700 received observations and applied actions to simulated agents 140, operation 800 may receive observations and applies actions to the actual agents 140 that were generally represented by those simulated agents 140 during training of the policy network Π by algorithm 700.

Operation 800 iterates until it is ended in subprocess 810. The operation may be ended by a user operation (e.g., via user system 130), or may be ended automatically (e.g., without human intervention) or semi-automatically (e.g., with human confirmation) in response to the satisfaction of a terminal condition. For example, in the traffic control problem, operation 800 may be ended when a mining shift ends or the mining operation ends, when the number of trucks drops below k+1, and/or the like. If the operation is ended (i.e., "Yes" in subprocess 810), operation 800 ends. Otherwise, if the operation continues (i.e., "No" in subprocess 810), operation 800 proceeds to subprocess 820.

In subprocess 820, observations are received from all of the plurality of agents 140. Subprocess 820 is essentially the same as subprocess 720, and therefore, will not be redundantly described. Any description related to subprocess 720 applies equally to subprocess 820. However, since operation 800 operates on actual non-simulated (e.g., physical) agents 140 in a real-world environment, the observations may be received directly or indirectly from the actual agents 140 or from an observation system that observes the agents 140 (e.g., measures the state of each agent 140) or collects observations from the agents 140. In the case that operation 800 is implemented in software 112 on platform 110, each agent 140 or the intermediate observation system may transmit the observations of the plurality of agents 140 to software 112 on platform 110 via network(s) 120B. For example, the observations may be "pushed" through an API provided by software 112 or "pulled" via an API provided by the observation system or a control system of each of the plurality of agents 140.

Subprocess 830 iterates over each and all of the plurality of (e.g., non-simulated, physical) agents 140 in the real-world environment. If a next agent 140 remains to be considered (i.e., "Yes" in subprocess 830), operation 800 proceeds to subprocess 832. Otherwise, if no agents 140 remain to be considered (i.e., "No" in subprocess 830), operation 800 proceeds to subprocess 840. As discussed elsewhere herein, due to agent variability, the number of agents 140 may change from iteration to iteration. Only those agents which are operational during the current iteration are considered in subprocess 830.

In subprocess 832, the k-nearest agents 140 to the current agent 140 under consideration are identified based on the particular distance metric being used. Subprocess 832 is essentially the same as subprocess 732, and therefore, will not be redundantly described. Any description related to subprocess 732 applies equally to subprocess 832.

In subprocess 840, redundant groups are removed, leaving m groups to be processed Subprocess 840 is essentially the same as subprocess 740, and therefore, will not be redundantly described. Any description related to subprocess 740 applies equally to subprocess 840.

Subprocess 860 iterates over each and all of the m groups. If a next group remains to be considered (i.e., "Yes" in subprocess 860), operation 800 proceeds to subprocess 862. Otherwise, if no groups remain to be considered (i.e., "No" in subprocess 860), operation 800 proceeds to subprocess 870.

In subprocess 862, the policy network Π, trained by algorithm 700, is applied to the current observations of the group of k+1 agents 140 to determine actions for each of the k+1 agents 140. Subprocess 862 is essentially the same as subprocess 762, and therefore, will not be redundantly described. Any description related to subprocess 762 applies equally to subprocess 862.

Subprocess 870 iterates over each of the plurality of agents 140 in the current iteration of operation 800. If a next agent 140 remains to be considered (i.e., "Yes" in subprocess 870), operation 800 proceeds to subprocess 880. Otherwise, if no agents 140 remain to be considered (i.e., "No" in subprocess 860), operation 800 returns to subprocess 810 to perform another iteration (unless the operation is ended).

Subprocess 880 determines whether the current agent 140 under consideration is a member of multiple groups. If the agent 140 is a member of multiple groups (i.e., "Yes" in subprocess 880), operation 800 proceeds to subprocess 882. Otherwise, if the agent 140 is a member of only one group (i.e., "No" in subprocess 880), operation 800 proceeds to subprocess 884.

In subprocess 882, the actions determined for each of the plurality of groups of which the current agent 140 is a member are aggregated into a single final action. Subprocess 882 is essentially the same as subprocess 782, and therefore, will not be redundantly described. Any description related to subprocess 782 applies equally to subprocess 882.

In subprocess 884, the final action determined for the current agent 140 under consideration is applied to the current agent 140. This final action may be the action determined in subprocess 862 for agents 140 that are members of only a single group or the aggregate action determined in subprocess 882 for agents 140 that are members of multiple groups. Since operation 800 operates on actual non-simulated (e.g., physical) agents 140 in a real-world environment, the application of an action in subprocess 884 may comprise controlling the agent 140 to perform the action in the real-world environment. For example, platform 110 may, directly or indirectly, transmit a control command, representing the determined action to be performed, to each of the plurality of agents 140 that is operational in the current iteration of operation 800. In particular, the control command may be transmitted over network(s) 120B to a controller of each agent 140. The controller of each agent 140 may receive the control command and operate the agent 140 to perform the action represented by that control command. This operation may comprise altering a setting of the agent 140 (e.g., speed, direction, temperature, voltage, operating mode, etc.), driving a physical actuator of the agent 140 (e.g., motor, switch, etc.), controlling a subsystem of the agent 140 (e.g., steering subsystem, braking subsystem, engine, etc.), and/or the like.

3. Example Use Case

As discussed above, the disclosed k-nearest multi-agent reinforcement learning algorithm 700 can train a policy network Π that is suitable for an environment in which the number of agents is variable. In addition, algorithm 700 addresses action dependency among highly interactive agents, thereby enabling optimal action selection to be feasibly performed by the trained policy network Π in industrial applications. Furthermore, by using weight-sharing, algorithm 700 makes model management very simple, since only a single policy network Π must be trained and maintained. Experimental results demonstrate that the solution converges during algorithm 700, even when experience replay is used for training the policy network Π.

An example use case of the disclosed k-nearest multi-agent reinforcement learning algorithm 700 in an industrial application will now be described. In particular, an implementation of algorithm 700 that was designed for the traffic control problem in a mine will be described. It should be understood that this example is non-limiting and only included to aid in the understanding of disclosed embodiments. Algorithm 700 may be similarly adapted for any other multi-agent industrial application.

In a mine, different trucks travel between different load locations (e.g., shovels) and dump locations. The destination of each truck may be set by a separate dispatching algorithm. In this example, the goal of the policy network Π is to set the speed of each truck in order to minimize traffic congestion and thereby maximize the total number of cycles that are completed in a shift. A reduction in traffic congestion can save millions of dollars in operating costs and significantly reduce carbon emissions.

It is not feasible to solve this problem analytically, since the solution must consider actuator delays (e.g., the tine span between the time at which a truck receives a control command that sets a target speed and the time at which the truck reaches the target speed), differences in roads and intersections within the mine, the multi-agent nature of the problem, and more. However, the disclosed k-nearest multi-agent reinforcement learning algorithm 700 can solve the problem, while addressing agent variability (i.e., the number of available trucks may change at any time during the shift) and action dependency (i.e., the speed of a truck may depend on the speed of a nearby truck).

To experimentally test algorithm 700, a digital twin of an actual mine was constructed as the simulated environment. The simulation was designed to mirror, not only the facility map, but the actual speed profiles of actual trucks in the mine. The value of k=4 was used, such that each group created by subprocess 732 consisted of k+1=5 trucks. This value was based on an understanding that a truck generally interacts with, at most, four other trucks, and the fact that the mine always had at least five operational trucks. It should be understood that similar criteria (e.g., number of agents 140 with which each agent 140 will normally interact in a particular application, minimum number of agents 140 in a particular application, etc.) may be used to select the value of k in other applications.

During the experiment, twelve-hour shifts in the mine were used as training episodes. The SAC algorithm was used to train policy network Π in subprocess 750. Each observation of a group of k+1 trucks included the location of each truck in the group, the travel distance between each pair of trucks in the group, the current speed of each truck in the group, the time elapsed since each truck in the group had left its most recent stop (e.g., load or dump site), the distance each truck had traveled since its most recent stop, and the travel distance from each truck to its current goal (e.g., dump or load site). The travel distance from each truck to its current goal was determined from the dispatching algorithm. Target speeds of the trucks were renewed every minute, and each group of trucks was tracked until the next time step to save the next observation in a sample in the replay buffer. The goal was to maximize the amount of material moved during the shift (i.e., maximize the number of cycles during the shift). Thus, the reward for each group was set as the total distance traveled by all of the trucks in the group from the time that the target speed was set until the next time step. This encouraged collaboration among the trucks.

The maximum-speed algorithm was used for comparison. The maximum-speed algorithm sets the speed of each truck to the maximum speed limit of the road upon which that truck is traveling. The maximum-speed algorithm represents a very strong baseline that most drivers choose intuitively. It is challenging for an algorithm to achieve a higher number of cycles per shift than the maximum-speed algorithm, since the trucks cannot travel faster than the speed limits. However, the experiment demonstrated that the disclosed k-nearest multi-agent reinforcement learning algorithm 700 achieved a higher number of cycles per shift than the maximum-speed algorithm. While algorithm 700 produced fewer instances at which the trucks were traveling at the speed limit than the maximum-speed algorithm, algorithm 700 also produced fewer instances in which the trucks were stopped or moving less than 5 miles per hour due to congestion than the maximum-speed algorithm. In fact, algorithm 700 improved the overall performance by occasionally lowering the trucks' speeds below the maximum speed limit. While this may seem counterintuitive, it works because higher speeds can sometimes lead to queuing and congestion further down the road.

FIGS. 9 and 10 each illustrate the number of cycles per shift that was achieved using the maximum-speed algorithm versus a policy network Π that was trained by the disclosed k-nearest multi-agent reinforcement learning algorithm 700 on twenty-seven trucks, according to a particular implementation. The policy network Π whose results are represented in FIG. 9 was tested in an environment with twenty-seven trucks, whereas the policy network Π whose results are represented in FIG. 10 was tested in an environment with twenty-two trucks. In other words, the policy network Π, whose results are represented in FIG. 10, was tested in an environment with five fewer trucks than the environment in which the policy network Π was trained, to demonstrate its performance with agent variability. In each graph, the gray line represents the minimum and maximum number of cycles for ten runs, the black line represents one standard deviation over the ten runs, and the black dot represents the average number of cycles per shift. The graphs demonstrate that the policy network Π, trained using algorithm 700, outperforms the maximum-speed algorithm, even when the number of agents 140 in the operational environment is different than in the training environment. Thus, algorithm 700 is robust and applicable to applications with variable numbers of agents.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A. B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method for training a reinforcement learning policy network to control agents in an environment, wherein the method comprises using at least one hardware processor to, in each of a plurality of training iterations:

group a plurality of agents into a plurality of groups that each consist of k+1 agents by, for each of the plurality of agents, identifying a group comprising the agent and k nearest other ones of the plurality of agents to the agent, wherein k is a predetermined number, and excluding any redundant ones of the identified groups from the plurality of groups;

use a batch of prior samples of prior groups from one or more prior training iterations to train a reinforcement learning policy network to determine actions for the k+1 agents in each of the plurality of groups based on observations of that group;

for each of the plurality of groups, determine the actions for the k+1 agents in the group by applying the reinforcement learning policy network to the observations of that group; and, for each of the plurality of agents, when the agent belongs to a single one of the plurality of groups, select an action for the agent based on the action for that agent that was determined by applying the reinforcement learning policy network to observations of the single group, when the agent belongs to two or more groups, select an action for the agent based on the actions that were determined by applying the reinforcement learning policy network to observations of the two or more groups, and simulate control of the agent to execute the selected action;

deploy the reinforcement learning policy network, as trained over the plurality of training iterations, to control a plurality of operational agents in a real-world environment; and, in each of a plurality of operational iterations, group the plurality of operational agents into a plurality of operational groups that each consist of k+1 operational agents by, for each of the plurality of operational agents, identifying an operational group comprising the operational agent and k nearest other ones of the plurality of operational agents to the operational agent, and excluding any redundant ones of the identified operational groups from the plurality of operational groups, for each of the plurality of operational groups, determine actions for the k+1 operational agents in the operational group by applying the deployed reinforcement learning policy network to observations of that operational group, and, for each of the plurality of operational agents, when the operational agent belongs to a single one of the plurality of operational groups, select an action for the operational agent based on the action for that operational agent that was determined by applying the deployed reinforcement learning policy network to observations of the single operational group, when the operational agent belongs to two or more operational groups, select an action for the operational agent based on the actions that were determined by applying the deployed reinforcement learning policy network to observations of the two or more operational groups, and control the operational agent to execute the selected action, wherein selecting an action for the agent based on the actions that were determined by applying the reinforcement learning policy network to observations of the two or more groups comprises calculating the action for the agent as a weighted average of the actions that were determined by applying the reinforcement learning policy network to observations of the two or more groups, wherein an action that was determined by applying the reinforcement learning policy network to observations of a first group that is closer to the agent than for which a total distance from the agent to all other agents in the first group is less than a total distance from the agent to all other agents in a second group is weighted higher than an action that was determined by applying the reinforcement learning policy network to observations of the second group.

2. The method of claim 1, wherein a redundant one of the identified groups is an identified group that consists of an identical set of k+1 agents as another identified group.

3. The method of claim 1, wherein the reinforcement learning policy network is trained using an off-policy deep reinforcement learning algorithm.

4. The method of claim 1, wherein selecting an action for the agent based on the actions that were determined by applying the reinforcement learning policy network to observations of the two or more groups comprises selecting only an action that was determined by applying the reinforcement learning policy network to observations of a group that is closest to the agent for which a total distance from the agent to all other agents in that group is less than a total distance from the agent to all other agents in any other of the two or more groups.

5. The method of claim 1, wherein k+1 is equal to a minimum possible number of agents in an environment in which the plurality of agents operate.

6. The method of claim 5, wherein k is greater than or equal to one and is less than one less than a number of the plurality of agents in the environment.

7. The method of claim 1, wherein each observation of a group comprises a state of each of the k+1 agents in the group.

8. The method of claim 1, further comprising using the at least one hardware processor to, in each of the plurality of training iterations:
randomly select the samples in the batch from a replay buffer; and
store a sample for each of the plurality of groups in the replay buffer.

9. The method of claim 1, wherein each sample in the batch comprises actions determined for a respective one of the prior groups, observations of that prior group before execution of the actions determined for that prior group, rewards obtained by that prior group following execution of the actions determined for that prior group, and next observations of that prior group following execution of the actions determined for that prior group.

10. The method of claim 1, wherein, for each of the plurality of agents, the selected action is executed in a digital twin of a real-world environment.

11. The method of claim 1, wherein each of the plurality of operational agents is an autonomous or semi-autonomous vehicle.

12. The method of claim 1, wherein each of the plurality of operational agents is a machine within an industrial process.

13. A system comprising:
at least one hardware processor; and
one or more software modules that are configured to, when executed by the at least one hardware processor, in each of a plurality of training iterations,
group a plurality of agents into a plurality of groups that each consist of k+1 agents by, for each of the plurality of agents, identifying a group comprising the agent and k nearest other ones of the plurality of agents to the agent, wherein k is a predetermined number, and excluding any redundant ones of the identified groups from the plurality of groups,
use a batch of prior samples of prior groups from one or more prior training iterations to train a reinforcement learning policy network to determine actions for the k+1 agents in each of the plurality of groups based on observations of that group,
for each of the plurality of groups, determine the actions for the k+1 agents in the group by applying the reinforcement learning policy network to the observations of that group, and,
for each of the plurality of agents,
when the agent belongs to a single one of the plurality of groups select an action for the agent based on the action for that agent that was determined by applying the reinforcement learning policy network to observations of the single group,
when the agent belongs to two or more groups, select an action for the agent based on the actions that were determined by applying the reinforcement learning policy network to observations of the two or more groups, and
simulate control of the agent to execute the selected action,
deploy the reinforcement learning policy network, as trained over the plurality of training iterations, to control a plurality of operational agents in a real-world environment, and,
in each of a plurality of operational iterations,
group the plurality of operational agents into a plurality of operational groups that each consist of k+1 operational agents by, for each of the plurality of operational agents, identifying an operational group comprising the operational agent and k nearest other ones of the plurality of operational agents to the operational agent, and excluding any redundant ones of the identified operational groups from the plurality of operational groups,
for each of the plurality of operational groups, determine actions for the k+1 operational agents in the operational group by applying the deployed reinforcement learning policy network to observations of that operational group, and,
for each of the plurality of operational agents,
when the operational agent belongs to a single one of the plurality of operational groups, select an action for the operational agent based on the action for that operational agent that was determined by applying the deployed reinforcement learning policy network to observations of the single operational group,
when the operational agent belongs to two or more operational groups, select an action for the operational agent based on the actions that were determined by applying the deployed reinforcement learning policy network to observations of the two or more operational groups, and
control the operational agent to execute the selected action,
wherein electing an action for the agent based on the actions that were determined by applying the reinforcement learning policy network to observations of the two or more groups comprises calculating the action for the agent as a weighted average of the actions that were determined by applying the reinforcement learning policy network to observations of the two or more groups, wherein an action that was determined by applying the reinforcement learning policy network to observations of a first group that is closer to the agent than for which a total distance from the agent to all other agents in the first group is less than a total distance from the agent to all other agents in a second group is weighted higher than an action that was determined by applying the reinforcement learning policy network to observations of the second group.

14. A non-transitory computer-readable medium having instructions stored therein, wherein the instructions, when executed by a processor, cause the processor to, in each of a plurality of training iterations:
group a plurality of agents into a plurality of groups that each consist of k+1 agents by,
for each of the plurality of agents, identifying a group comprising the agent and k nearest other ones of the plurality of agents to the agent, wherein k is a predetermined number, and
excluding any redundant ones of the identified groups from the plurality of groups;
use a batch of prior samples of prior groups from one or more prior training iterations to train a reinforcement learning policy network to determine actions for the k+1 agents in each of the plurality of groups based on observations of that group;
for each of the plurality of groups, determine the actions for the k+1 agents in the group by applying the reinforcement learning policy network to the observations of that group; and, for each of the plurality of agents, when the agent belongs to a single one of the plurality of groups, select an action for the agent based on the action for that agent that was determined by applying the reinforcement learning policy network to observations of the single group, when the agent belongs to two or more groups, select an action for the agent based on the actions that were determined by applying the reinforcement learning policy network to observations of the two or more groups, and simulate control of the agent to execute the selected action;

deploy the reinforcement learning policy network, as trained over the plurality of training iterations, to control a plurality of operational agents in a real-world environment; and, in each of a plurality of operational iterations, group the plurality of operational agents into a plurality of operational groups that each consist of k+1 operational agents by, for each of the plurality of operational agents, identifying an operational group comprising the operational agent and k nearest other ones of the plurality of operational agents to the operational agent, and excluding any redundant ones of the identified operational groups from the plurality of operational groups, for each of the plurality of operational groups, determine actions for the k+1 operational agents in the operational group by applying the deployed reinforcement learning policy network to observations of that operational group, and, for each of the plurality of operational agents, when the operational agent belongs to a single one of the plurality of operational groups, select an action for the operational agent based on the action for that operational agent that was determined by applying the deployed reinforcement learning policy network to observations of the single operational group, when the operational agent belongs to two or more operational groups, select an action for the operational agent based on the actions that were determined by applying the deployed reinforcement learning policy network to observations of the two or more operational groups, and control the operational agent to execute the selected action, wherein selecting an action for the agent based on the actions that were determined by applying the reinforcement learning policy network to observations of the two or more groups comprises calculating the action for the agent as a weighted average of the actions that were determined by applying the reinforcement learning policy network to observations of the two or more groups, wherein an action that was determined by applying the reinforcement learning policy network to observations of a first group that is closer to the agent than for which a total distance from the agent to all other agents in the first group is less than a total distance from the agent to all other agents in a second group is weighted higher than an action that was determined by applying the reinforcement learning policy network to observations of the second group.

* * * * *